(12) United States Patent
Baskaran

(10) Patent No.: US 8,806,200 B2
(45) Date of Patent: Aug. 12, 2014

(54) METHOD AND SYSTEM FOR SECURING ELECTRONIC DATA

(71) Applicant: Prakash Baskaran, Ashburn, VA (US)

(72) Inventor: Prakash Baskaran, Ashburn, VA (US)

(73) Assignee: Prakash Baskaran, Ashbuurn ( * ) Notice: Subject to any disclaimer, the term of this patent is extended or adjusted under 35 U.S.C. 154(b) by 0 days.

(21) Appl. No.: 13/689,847

(22) Filed: Nov. 30, 2012

(65) Prior Publication Data

US 2014/0156991 A1 Jun. 5, 2014

(51) Int. Cl.
*H04L 29/06* (2006.01)

(52) U.S. Cl.
USPC .......................................................... 713/165

(58) Field of Classification Search
USPC .......................................................... 713/165
See application file for complete search history.

(56) References Cited

U.S. PATENT DOCUMENTS

| | | | |
|---|---|---|---|
| 2008/0263363 A1* | 10/2008 | Jueneman et al. | 713/184 |
| 2009/0100268 A1* | 4/2009 | Garcia et al. | 713/184 |
| 2009/0177894 A1* | 7/2009 | Orsini et al. | 713/193 |
| 2010/0146269 A1* | 6/2010 | Baskaran | 713/165 |
| 2011/0271121 A1* | 11/2011 | Imamoto | 713/193 |
| 2012/0260346 A1* | 10/2012 | Carey et al. | 726/26 |

* cited by examiner

*Primary Examiner* — Teshome Hailu
*Assistant Examiner* — Thanh Le
(74) *Attorney, Agent, or Firm* — Barry Choobin; Patent360 LLC

(57) ABSTRACT

The various embodiments herein provide a method for securing electronic data using an automatic key management technique to manage cryptographic keys. The method for securing electronic data comprises providing a data to a writer module, embedding a data usage policy, encrypting the data through a symmetric key encryption, creating a secure data file format for the data, accessing the secure data file format through a reader module, checking for a data file usage policy, dynamically updating the data file usage policy, if there is a change in the file usage policy on an application server, authenticating a user as per the file usage policy, decrypting the secure data file format, invoking one or more adapters and enforcing the data file usage policy. The secure data file format herein comprises data encrypted with a layered structure, instructions for computation of keys along with randomized data and instructions for de-randomizing of data.

10 Claims, 5 Drawing Sheets

METHOD AND SYSTEM FOR SECURING ELECTRONIC DATA

BACKGROUND

1. Technical Field

The embodiments herein generally relate to data security and particularly relates to preventing unauthorized access to electronic data stored or transmitted across computer networks. The embodiments herein more particularly relates to an automated approach to manage cryptographic keys for securing electronic data.

2. Description of the Related Art

Cryptography is the practice and study of techniques for secure data communication among the communication networks. Generally, cryptography includes two category of techniques, namely, shared key cryptography (symmetric key) and public key cryptography (asymmetric key) to help protect the sensitive data sent across a network.

One of the most important and vexing issues in cryptography is the problem of selecting and distributing the encryption key amongst the participants. The conventional approach of cryptography uses a shared secret key, such that the same key is used to encrypt and decrypt data. However, it is a difficult task to choose the key and communicate it to the participants. If the key is chosen by the sender and sent along with the message to the recipient, there is a chance that the data is uncovered and the encryption scheme is broken. Generally, it is advisable to send the key separately and over a different channel of communication to reduce the chances of key loss. The requirement of a different channel presents a difficult obstacle which increases the time and expense of using symmetric systems. An additional problem with conventional symmetric cryptography is that if the same key is used in many messages then in the event of key loss or divulgence the security of all past messages available to an adversary is lost and also any future communication using the same key is also affected.

One response to this problem is the use of different shared keys for each communication to address the key loss problem. However the key distribution problem still remains unaddressed. The sender and the receiver must first establish a pad of one-time keys, such that each has the pad and can use corresponding keys in the sequence for consecutive messages. This method is however expensive as the keys are quickly exhausted and every pair of participants should have their own mutual one-time keypads. If a keypad is lost or stolen, then again the data/messages are potentially at risk.

The key distribution problem is substantially resolved by the public key cryptography by generating a private key-public key pair for key distribution. The messages are encrypted using a public key of the recipient and subsequently decrypted using the corresponding a private key of the recipient. The public key of any participant can be freely distributed to anyone who would like to send encrypted messages to that person. In this strategy, it is the private key that must be protected, and since it is retained locally and used only to decrypt messages it remains relatively secure. There is no need to transmit the private key. The two keys associated with a public key implementation are mathematically related but it is computationally infeasible to determine the private key from its corresponding public key. This is due to the perceived intractability of factoring large integers into their prime factors. If this premise proves unfounded then the public key approach will become vulnerable to adversaries.

Also the encryption and decryption processes using public key crypto systems are generally much slower than typical symmetric key systems.

Among the existing public key cryptographic solutions, PGP (Pretty Good Privacy) is the widely used solution to protect sensitive data sent across a network. It is primarily a data encryption and decryption computer program that provides cryptographic privacy and authentication for data communication. PGP is often used for signing, encrypting and decrypting texts, e-mails, files, directories and whole disk partitions to increase the security of e-mail communications. PGP works by compressing plain text data and then creating a session key which is a random number. This random number is then run through the cryptography software to create the session key, which forms a public/private key for the sender. When the plain text is encrypted, the public key is encrypted to the recipient's private key. When the recipient receives the cipher text, he uses his private key to decrypt the data.

However, PGP is considered to be a complex process, as for PGP encryption to work both the sender and the recipient should be using PGP. If the sender emails a file to a recipient who is not using the PGP, the recipient will not be able to open the file. Also managing keys is a challenging task for users new to PGP. Further, keys that are lost or corrupted cause a security risk to users in a highly secure environment.

Across all industries the requirements for managing cryptographic keys are becoming ever-more complex. Ensuring the right key is in the right place, at the right time is mandated by many organizations. This is a complicated requirement as most businesses need to manage an ever-increasing number of keys while reducing the risk of internal and external fraud, as well as keeping the costs at a minimum.

One solution to manage keys is the intervention of key distribution centers (KDC) or a key manager. The major problem of any key manager is the security infrastructure that has to exist to avoid compromising the key. Enterprises usually invest a lot to secure their computing infrastructure from intruders/infiltrators. But hardly any investment is done to prevent internal authorized users accessing the information to leak that information out. For example when the keys are stored in a database a lot of consideration is used to prevent/limit access to this database by any user. But usually there will be one or more DBAs who have a completely un-restricted access to the database (for maintenance, backup, tuning, etc.) and they can easily retrieve all the keys in one go.

Hence, there is a need for a method and system to secure electronic data. There is also a need for a method and system to automatically manage cryptographic keys. Further there is also a need for a method and system for automatically managing cryptographic keys without intervention of any key distribution centers or key managers.

The abovementioned shortcomings, disadvantages and problems are addressed herein and which will be understood by reading and studying the following specification.

OBJECTS OF THE EMBODIMENTS

The primary object of the embodiments herein is to provide a method and system for securing electronic data by automatically managing cryptographic keys.

Another object of the embodiments herein is to provide a method and system for securing electronic data by providing a structured and layered protection for any electronic content of any format.

Another object of the embodiments herein is to provide a method and system for securing electronic data without the need for a fixed key for encryption/decryption.

Another object of the embodiments herein is to provide a method and system for securing electronic data without having to store or transport any keys for encryption/decryption.

Another object of the embodiments herein is to provide a method and system for securing electronic data without the need for any key distribution centers or third party key managers.

Another object of the embodiments herein is to provide a method and system for securing electronic data without creating any identities ahead of encryption.

Another object of the embodiments herein is to provide a method and system for securing electronic data which allows integration with a variety of applications or platforms.

Another object of the embodiments herein is to provide a method and system which uses varied authentication mechanisms to authenticate the users to decrypt the protected content.

These and other objects and advantages of the embodiment herein will become readily apparent from the following summary and the detailed description taken in conjunction with thee accompanying drawings.

SUMMARY

The various embodiments herein provide a method and system for securing electronic data. The method involves an automatic key management technique to manage cryptographic keys.

The method for securing electronic data comprising the steps of providing a data to a writer module, embedding a data usage policy, encrypting the data through a symmetric key encryption, creating a secure data file format for the data, accessing the secure data file format through a reader module, checking for the data file usage policy, dynamically updating the data file usage policy, if there is a change in the data file usage policy on an application server, authenticating an end user based on the data file usage policy, authorizing the user to access the data based on the authentication status, decrypting the secure data file format, invoking one or more adapters and enforcing the data file usage policy. The secure data file format herein comprises data encrypted with a layered structure, instructions for computation of keys along with randomized data and instructions for de-randomizing of data.

According to an embodiment herein, the writer module employs at least one of a standard algorithm for the symmetric key encryption.

According to an embodiment herein, the reader module uses a symmetric key decryption for accessing the secure data file format using at least one of a standard algorithm.

According to an embodiment herein, the data is extracted from a digital data source comprising dynamic data source such as an application or from a static data source comprising a computer, a smart phone, a PDA, or a data storage unit.

According to an embodiment herein, the data is any MIME (Multipurpose Internet Mail Extensions) Media type.

According to an embodiment herein, the symmetric key encryption comprising the steps of creating a data file signature, adding a Gateway Header Block (GHB), encrypting the GHB using a fixed key and a standard encryption algorithm, creating a file icon block and an open header block, creating a first data record block with a file policy and an information for computing a second key, creating a second data record block with an adapter data and an information for computing a third key, computing the third key, creating a first random data block and a file data block, creating a first encrypted block by encrypting the file data block with the third key and a standard encryption algorithm, creating a second random data block, creating the second encrypted block by encrypting the second data record block, first random data block, first encrypted block and the second random data block with the second key and the standard encryption algorithm and creating the third encrypted block by encrypting the first data record block and the second encrypted block with the first key and the standard encryption algorithm.

According to an embodiment herein, the GHB comprises information to communicate with a server and for computing a first key, wherein the information for computing the first key comprises at least one of IP address, name of the server, port numbers, protocols and other communication information.

According to an embodiment herein, the standard algorithm is at least one of AES 256 or any other NSA standard symmetric key encryption algorithm.

According to an embodiment herein, the symmetric key decryption comprising the steps of decrypting GHB using the fixed key, computing the first key using the information for computing the first key in GHB, decrypting the third encrypted block using the first key, extracting the file usage policy from the first data record block, computing the second key using information in the first data record block, decrypting the second encrypted block using the second key, discarding the second random data block, computing the third key using the information in the second data record block and extract the adapter data, decrypting the first encrypted block using the third key, discarding the first random data block and extracting the file content.

According to an embodiment herein, the reader module comprises intelligence to re-compute the first key using the information for computing the first key.

According to an embodiment herein, the reader module comprises intelligence to re-compute the second key using the information for computing the second key.

According to an embodiment herein, the reader module comprises intelligence to re-compute the third key using the information for computing the third key.

According to an embodiment herein, the reader module is adapted to collect and provide file usage information to the application server. The file usage information comprises information related to the activities performed by a user on the data file such as printing a file, copying content to clipboard, modifying the file, exporting a file and the like.

According to an embodiment herein, the keys are created through computation without requiring the storage of any keys.

According to an embodiment herein, the secure file format comprising a signature block, a gateway header block encrypted with a fixed key and an information to compute a first key, a file icon block, an open data block, a first data record block, a second data record block, a first random data block, a file data block and a second random data block.

According to an embodiment herein, a Gateway Header Block is formed by encrypting the communication information with a fixed key or an application key According to an embodiment herein, the first encrypted block is formed by encrypting the file data block.

According to an embodiment herein, the second encrypted block is formed by encrypting the second data record block, first random data block, first encrypted block and the second random data block.

According to an embodiment herein, the third encrypted block is formed by encrypting the first data record block and the second encrypted block.

According to an embodiment herein, the size of secure data file record blocks vary from data file to data file.

According to an embodiment herein, the size of the random data blocks vary from data file to data file.

According to an embodiment herein, the encrypted layers of the secure data file format further comprises embedded policies for controlling the data file usage based on the time, location and other file usage policies.

According to an embodiment herein, varied authentication mechanisms are used to authenticate the users to decrypt the protected content. The authentication mechanism can be explicit or implicit or implied based on the policy and context of opening a secure data file. For example, in the context of a secure network, a file can be opened with implicit authentication of an AD session. In another case, the authentication is done through an allowed authorization provider such as an OAuth.

Embodiments herein further provide a system for securing electronic data. The system comprises a plurality of data sources to provide a data, an application server, a writer module adapted to embed a data usage policy, encrypt the data through a symmetric key encryption and create a secure data file format for the data and a reader module adapted to access the secure data file format through a reader module, check the data file usage policy, dynamically update the data file usage policy if there is a change in the data file usage policy in the application server, authenticate a user based on file usage policy, authorize the user to access the data based on the authentication status, decrypt the secure data file format, invoke one or more adapters and enforce the data file usage policy.

According to an embodiment herein, the one or more adapters are plug-ins to the reader module to provide additional functionalities. For example, an adapter for advertisement, an adapter for payment processing, an adapter for content refreshing and the like. Here, the one or more adapters are invoked by embedding data required for execution of one or more adapters with the data file.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
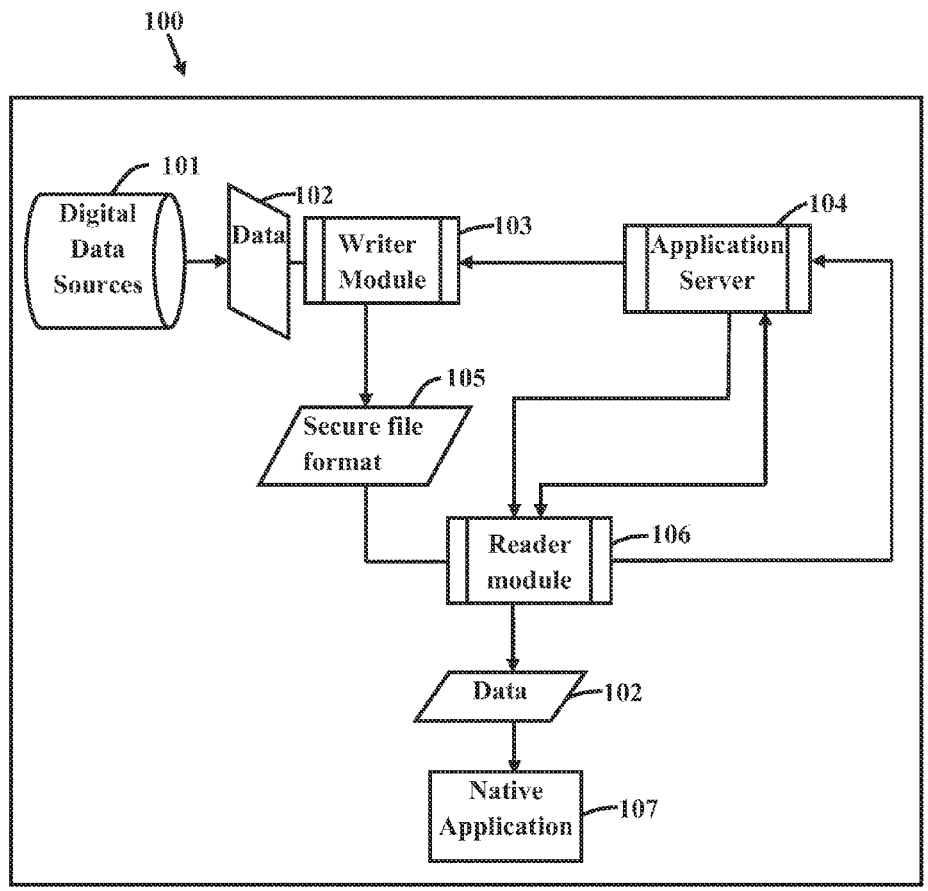
FIG. 1 is a block diagram illustrating a system for securing electronic data, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The method for securing electronic data comprising the steps of providing a data to a writer module, embedding a data usage policy, encrypting the data through a symmetric key encryption, creating a secure data file format for the data, accessing the secure data file format through a reader module, checking for the data file usage policy, authenticating a user as per policy, dynamically updating the data file usage policy, if there is a change in the data file usage policy on an application server, authenticating an end user based on the file usage policy, authorizing the user to access the data based on the authentication status, decrypting the secure data file format, invoking one or more adapters and enforcing the data file usage policy. The secure data file format herein comprises data encrypted with a layered structure, instructions for computation of keys along with randomized data and instructions for de-randomizing of data.

The writer module employs at least one of a standard algorithm for the symmetric key encryption. The reader module uses a symmetric key decryption for accessing the secure data file format using at least one of a standard algorithm.

The data is extracted from a digital data sources comprising a dynamic data source such as an application or from a static data source comprising a computer, a smart phone, a PDA, or a data storage unit, where the data is any MIME (Multipurpose Internet Mail Extensions) Media type.

The symmetric key encryption comprising the steps of creating a data file signature, adding a Gateway Header Block (GHB), encrypting the GHB using a fixed key and a standard encryption algorithm, creating a file icon block and a open header block, creating a first data record block with a file policy and an information for computing a second key, creating a second data record block with an adapter data and an information for computing a third key, computing the third key, creating a first random data block, a file data block, creating a first encrypted block by encrypting the file data block with the third key and a standard encryption algorithm, creating a second random data block, creating the second encrypted block by encrypting the second data record block, first random data block, first encrypted block and the second random data block with the second key and the standard encryption algorithm and creating the third encrypted block by encrypting the first data record block and the second encrypted block with the first key and the standard encryption algorithm.

The GHB comprises information to communicate with a server and for computing a first key, wherein the information for computing the first key comprises at least one of IP address, name of the server, port numbers, protocols and other communication information.

The standard algorithm is at least one of AES 256, or any other NSA standard symmetric key encryption algorithm.

The symmetric key decryption comprising the steps of decrypting GHB using the fixed key, computing the first key using the information for computing the first key in GHB, decrypting the third encrypted block using the first key, extracting the file usage policy from the first data record block, computing the second key using information in the first data record block, decrypting the second encrypted block using the second key, discarding the second random data block, computing the third key using the information in the second data record block and extract the adapter data, decrypting the first encrypted block using the third key, discarding the first random data block and extracting the file content.

The reader module comprises intelligence to re-compute the first key using the information for computing the first key, re-compute the second key using the information for computing the second key and to re-compute the third key using the information for computing the third key. The reader module is adapted to authenticate a user based on policy, to update the policy if there are changes to the policy on the application server, to invoke adapters and to collect and provide file usage information to the application server. Here the keys are created computationally without requiring the storage of any keys.

The one or more adapters are a plug-in to the reader module to provide additional functionalities to the reader module. The one or more adapters is invoked by embedding data required for execution of one or more adapters with the data file. For example, an adapter for advertisement, an adapter for payment processing, an adapter for content refreshing and the like.

The secure data file format comprises a signature block, a gateway header block encrypted with a fixed key and information to compute a first key, a file icon block, an open data block, a first data record block, a second data record block, a first random data block, a file data block and a second random data block. The first encrypted block is formed by encrypting the file data block. The second encrypted block is formed by encrypting the second data record block, the first random data block, the first encrypted block and the second random data block. The third encrypted block is formed by encrypting the first data record block and the second encrypted block.

The encrypted layers of the secure data file format further comprises embedded policies for controlling the data file usage based on the time, location and other file usage policies.

FIG. 1 is a block diagram illustrating a system for securing electronic data, according to an embodiment herein. As shown in FIG. 1, the system for securing data 100 comprises a one or more digital data sources 101, a data 102, a writer module 103, an application server 104, a secure data file format 105, a reader module 106 and a native application 107.

The data 102 is extracted from one or more digital data source 101. The digital data source 101 comprises at least one of a dynamic data source such as an application or a static data source such as a computer, a smart phone, a PDA, or a data storage unit. The data file 102 is any MIME (Multipurpose Internet Mail Extensions) Media type. The writer module 103 retrieves the data file usage policy from the application server 104. The writer module further embeds the file usage policy to the data and encrypts the data 102 through a symmetric key encryption. The encryption process in turn further creates a secure data file format 105 for the data 102.

The writer module 103 employs at least one of a standard algorithm for the symmetric key encryption. If there is a change in the data file usage policy on the application server 104, the same is dynamically updated at the writer module 103.

The reader module 106 uses a symmetric key decryption for accessing the secure data file format 105. Further the reader module 106 checks for the data file usage policy with the application server 104. If there is a change in the data file usage policy in the application server 104, the reader module 106 dynamically updates the usage policy associated with the data 102 and decrypts the secure data file format 105. The reader module 106 further invokes one or more adapters and enforces the data file usage policy. The reader module 106 decrypts the secure data file formal through a symmetric key decryption employing at least one of a standard algorithm to re-generate the data file 102. The regenerated data 102 is then integrated with the native application 107.

Figure 2:
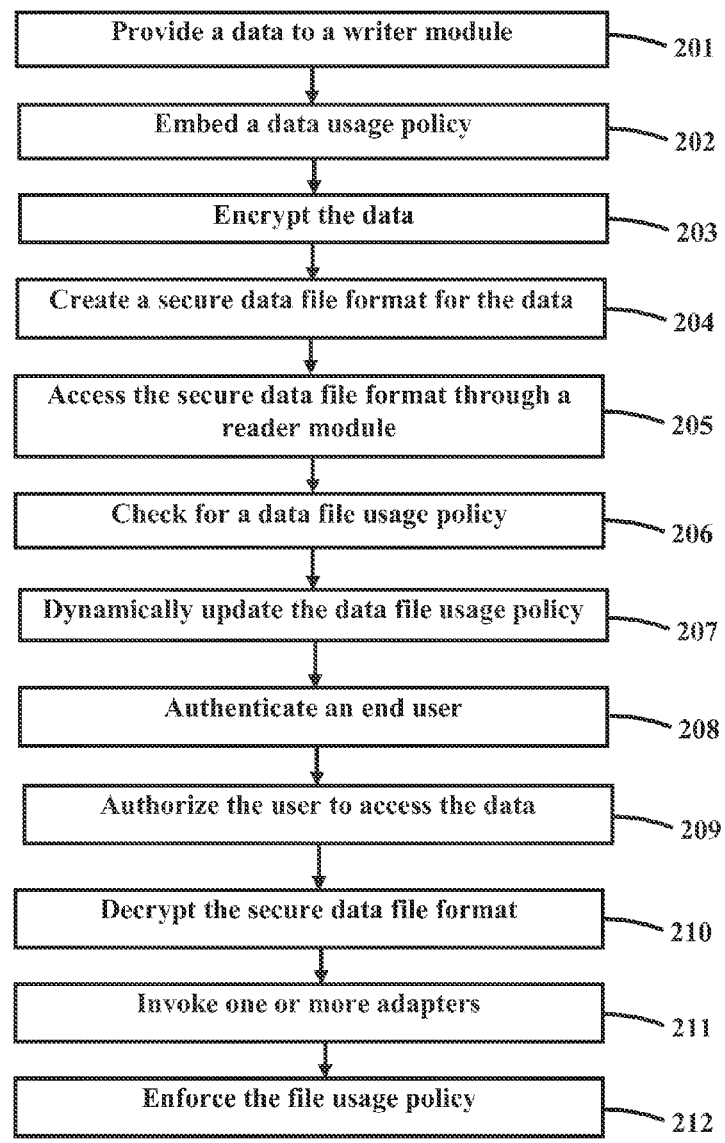
FIG. 2 is a flow diagram illustrating a method for securing electronic data, according to an embodiment herein.

FIG. 2 is a flow diagram illustrating a method for securing electronic data, according to an embodiment herein. The method comprising extracting data from one or more data sources and providing the data to a writer module (201). The data is further embedded with a data usage policy extracted from the application server (202). The data is then encrypted through a symmetric key encryption (203) to creating a secure data file format (204). The reader module then access the secure data file format (205), checks for the data file usage policy (206), dynamically update the data file usage policy, if there is a change in the data file usage policy on an application server (207), authenticate a user based on the file usage policy (208) and authorize the user to access the data based on the authentication status (209). Further the reader module decrypts the secure data file format (210), invokes one or more adapters (211), and enforce the data file usage policy (212) The secure data file format herein comprises data encrypted with a layered structure, instructions for computation of keys along with randomized data and instructions for de-randomizing of data.

The writer module and the reader module herein employ at least one of a standard algorithm for the symmetric key encryption/decryption.

The data is extracted from a digital data sources including at least one of dynamic data source such as but not limited to an application or a static data source such as but not limited to a computer, a smart phone, a PDA, or a data storage unit. Further the data file is of any MIME (Multipurpose Internet Mail Extensions) Media type.

Figure 3:
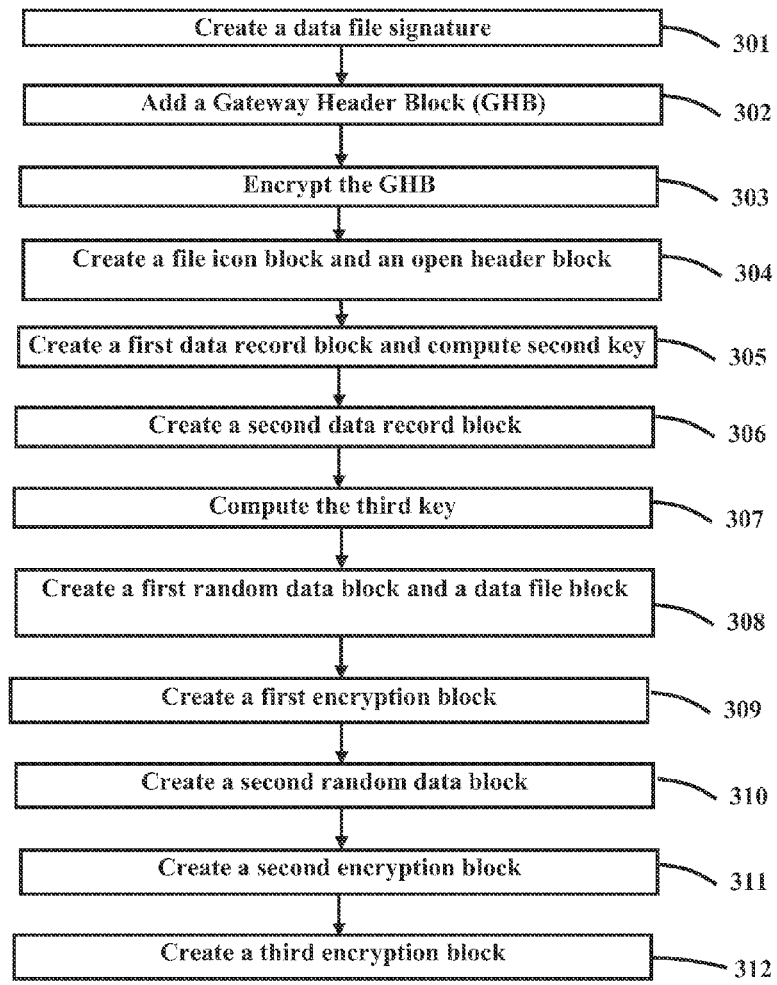
FIG. 3 is a flow diagram illustrating a symmetric key encryption, according to an embodiment herein.

FIG. 3 is a flow diagram illustrating a symmetric key encryption, according to an embodiment herein. According to FIG. 3, the symmetric key encryption comprising the steps of creating a data file signature (301), adding a Gateway Header Block (GHB) (302), encrypting the GHB using a fixed key and a standard encryption algorithm (303). The encryption further comprises creating a file icon block and a open header block (304), creating a first data record block with a file policy and an information for computing a second key (305), creating a second data record block with an adapter data and an information for computing a third key (306), computing the third key (307) and creating a first random data block and a file data block (308). The encryption further comprises creating a first encrypted block by encrypting the file data block with the third key and a standard encryption algorithm (309), creating a second random data block (310), creating the second encrypted block by encrypting the second data record block, first encrypted block, first random data block and the second random data block with the second key and the standard encryption algorithm (311) and creating the third encrypted block by encrypting the first data record block and the second encrypted block with the first key and the standard encryption algorithm (312).

The GHB comprises information to communicate with the application server and for computing the first key. The information for computing the first key comprises at least one of but not limited to IP address, name of the server, port numbers, protocols and other communication information.

The standard algorithm used herein for encryption includes at least one of but not limited to AES 256 or any other NSA standard symmetric key encryption algorithm.

Figure 4:
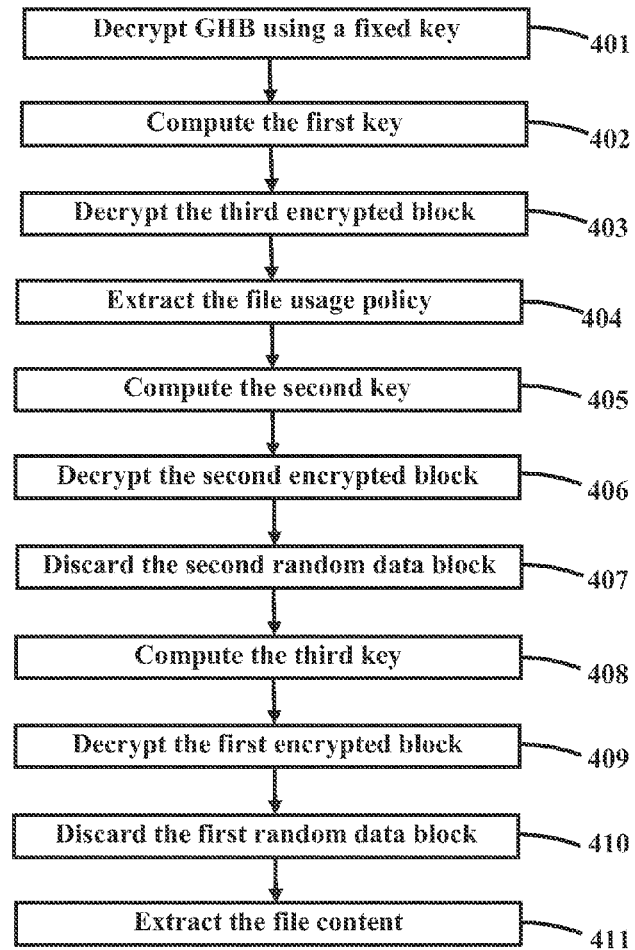
FIG. 4 is a flow diagram illustrating a symmetric key decryption, according to an embodiment herein.

FIG. 4 is a flow diagram illustrating a symmetric key decryption, according to an embodiment herein. According to FIG. 4, the symmetric key decryption comprising the steps of decrypting the gateway header block using the fixed key, computing the first key using the information for computing the first key in GHB, decrypting the third encrypted block using the first key, extracting the file usage policy from the first data record block, computing the second key using information in the first data record block, decrypting the second encrypted block using the second key, discarding the second random data block, computing the third key using the information in the second data record block and extracting the adapter data, decrypting the first encrypted block using the third key, discarding the first random data block and extracting the file content.

The reader module comprises intelligence to re-compute the first key using the information for computing the first key, re-compute the second key using the information for computing the second key and re-compute the third key using the information for computing the third key.

The reader module is adapted to collect and provide file usage information to the application server and updating of the file usage policies from the application server. The keys are created randomly without requiring the storage of any keys.

Figure 5:
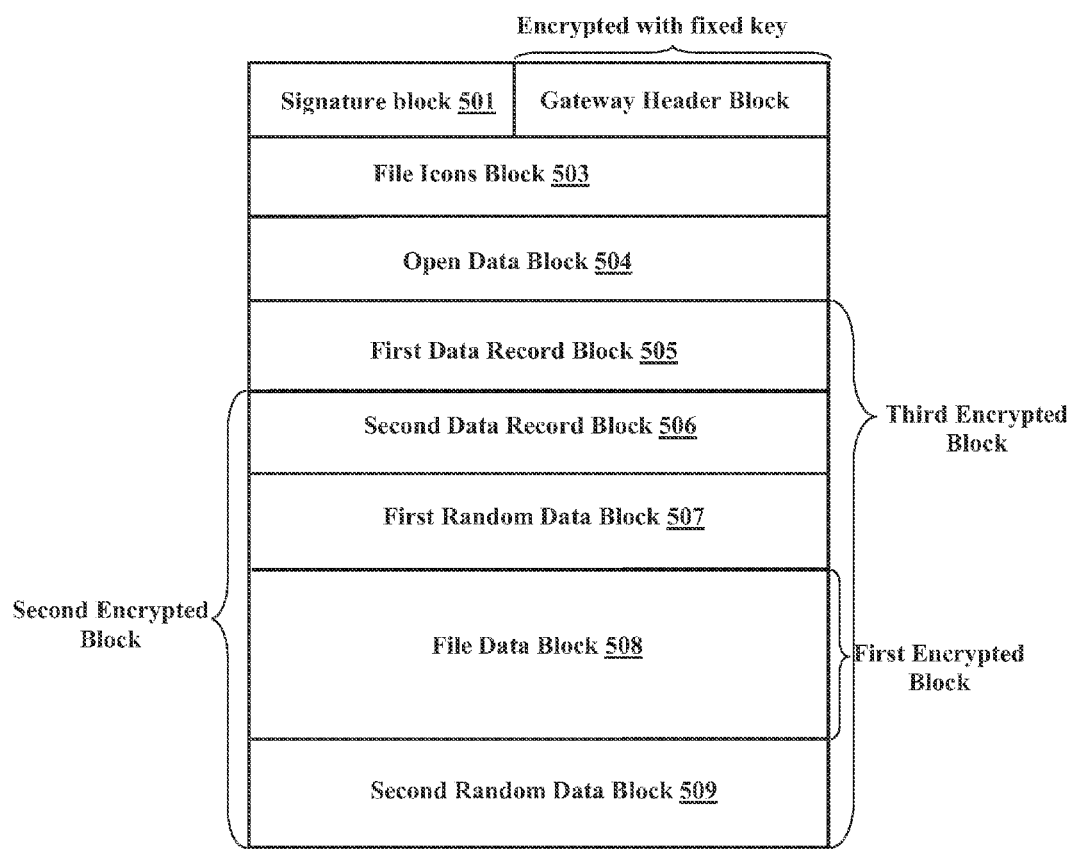
FIG. 5 is a block diagram illustrating a structure of the secure data file format, according to an embodiment herein.

FIG. 5 is a block diagram illustrating a structure of the secure file format, according to an embodiment herein. As shown in FIG. 5, the secure data file format comprises a signature block 501, a gateway header block 502, a file icon block 503, an open data block 504, a first data record block 505, a second data record block 506, a first random data block 507, a file data block 508 and a second random data block 509.

The file data block 508 encrypted with a first key forms a first encrypted block. The encrypted file data block 508, the first random data block 507, the second random data block 509, and the second data record block 506 encrypted with a second key and a standard encryption algorithm forms the second encrypted block. The first data record block 505 and the second encrypted block encrypted with a third key and a standard encryption algorithm forms the third encrypted block.

The gateway header block comprises information to compute a first key. The first data record block comprises policy records and information to compute the second key. The second data record block 506 comprises adopter records and information to computer the third key.

The embodiments herein provide a method for securing electronic data by automatic management of cryptographic keys. The embodiments do not involve creation, transportation or storage of any keys in die entire encryption or decryption process and thus the use of key distribution centers or third party key manager are avoided. The user needs to have at least one of the writer module/application or reader module/application running at the content source such as computer, smart phone or PDA. The method herein achieves securing electronic data at a less cost.

The AES 256 is the industry standard algorithm for encryption. The proposed technique removes all complexities, limitations and vulnerabilities associated with the traditional key manager approach such as generation, storage, transportation, rotation and destruction of cryptographic keys. The embodiments herein meet all security objectives such as integrity, confidentiality, availability, and user control on encryption.

According to the embodiments herein, there is no need to know or create the identities such as users, group of users or applications prior to encryption process. There exists a true separation between authentication, authorization, encryption, policy management and policy enforcement. The embodiments herein allow integration with any application or platform and support any authentication source.

The embodiments herein enables randomizing the cipher text with varying results for same underlying content, extending the capabilities by storing an application key and using the application key to encrypt one of the layer within the file format and envelope the entire cipher text. The file structure enables to wrap around any type of file and provide a structured and layered protection. The layered structure herein enables instructions to be embedded to recreate the keys. The method provides for randomizing the encrypted content and the ability to recreate the original content at the time of decryption without losing the integrity of the original content.

By automating many of the manual processes associated with keys, it helps to reduce human error, enhance regulatory compliance and eliminate key management. It also helps in delinking the users from actual keys and allows the use of multiple authenticators for user authentication and authorization. Moreover it allows the file to be encrypted once and to be shared with many users at the same time.

Although the embodiments herein are described with various specific embodiments, it will be obvious for a person skilled in the art to practice the embodiments herein with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

I claim:

1. A method for securing electronic data by encrypting the electronic data through symmetric key encryption, thereby creating a secured data file format for the encrypted electronic data, wherein the step of encrypting the electronic data through the symmetric key encryption comprises the following steps:

creating a data file signature;

adding a Gateway Header Block (GHB) which comprises information to communicate with a server and for computing a first key, wherein the information for computing the first key comprises at least one of IP address, name of the server, port numbers, protocols and other communication information;

encrypting the GHB using a fixed key and a standard encryption algorithm;

creating a file icon block and an open header block;

creating a first data record block with a file policy and information for computing a second key;

creating a second data record block with an adapter data and information for computing a third key;

computing a third key;

creating a first random data block and a file data block;

creating a first encrypted block by encrypting the file data block with the third key and a standard encryption algorithm;

creating a second random data block;

creating the second encrypted block by encrypting the second data record block, first random data block, first encrypted block and the second random data block, with the second key and the standard encryption algorithm; and creating the third encrypted block by encrypting the first data record block and the second encrypted block with the first key and the standard encryption algorithm.

2. The method as claimed in claim 1, wherein the method further includes the step of employing at least one of a standard algorithm for the symmetric key encryption.

3. The method as claimed in claim 1, wherein the method further includes the step of using a symmetric key decryption for accessing the secure data file format using at least one of a standard algorithm.

4. The method as claimed in claim 1, wherein the data is extracted from a digital data source, said digital data source being one of a dynamic data source comprising an application and a static data source.

5. The method as claimed in claim 1, wherein the data is a MIME (Multipurpose Internet Mail Extensions) Media type.

6. The method as claimed in claim 1, wherein the standard encryption algorithm is selected from the group consisting of AES 256, and NSA standard symmetric key encryption algorithms.

7. The method as claimed in claim 1, wherein the method further includes the step of decrypting the encrypted data through symmetric key decryption, wherein the step of symmetric key decryption includes the following steps:

decrypting GHB using the fixed key;

computing the first key using the information for computing the first key in GHB;

decrypting the third encrypted block using the first key and extracting the file usage policy from the first data record block;

computing the second key using information in the first data record block;

decrypting the second encrypted block using the second key;

discarding the second random data block;

computing the third key using the information in the second data record block and extracting the adapter data;

decrypting the first encrypted block using the third key;

discarding the first random data block; and extracting the data from the secured data file.

8. The method of securing electronic data by encrypting the electronic data through symmetric key encryption, thereby creating a secured data file format for the encrypted electronic data as claimed in claim 1 wherein, the step of creating a secure data file format includes the step of creating a secure data file format comprising:

the data signature block;

the gateway header block encrypted with a fixed key and information to compute a first key:

the file icon block;

the open data block;

the first data record block, the second data record block;

the first random data block;

the file data block; and the second random data block:

wherein the file data block forms a first encrypted block, the second encrypted block is created by encrypting the second data record block, the first random data block, the first encrypted block and the second random data block, and wherein the third encrypted block is created by encrypting the first data record block and the second encrypted block.

9. A system for securing electronic data, said system comprising a writer module and a reader module, wherein said writer module is configured to encrypt the electronic data through a symmetric key encryption thereby generating a secured data file format for the encrypted electronic data, said writer module further configured to:

create a data file signature;

add a Gateway Header Block (GHB), said GHB configured to communicate with a server and compute a first key, wherein the information for computing the first key comprises at least one of IP address, name of the server, port numbers, and protocols;

encrypt the GHB using a fixed key and a standard encryption algorithm;

create a file icon block and an open header block;

create a first data record block with a file policy and information for computing a second key;

create a second data record block with an adapter data and information for computing a third key;

compute a third key;

create a first random data block and a file data block;

create a first encrypted block by encrypting the file data block with the third key and a standard encryption algorithm;

create a second random data block;

create the second encrypted block by encrypting the second data record block, first random data block, first encrypted block and the second random data block, with the second key and the standard encryption algorithm; and create the third encrypted block by encrypting the first data record block and the second encrypted block with the first key and the standard encryption algorithm; and wherein the reader module is configured to receive the secured data file comprising the encrypted data, and decrypt the encrypted electronic data through symmetric key decryption, said reader module further configured to:

decrypt GHB using the fixed key;

compute the first key using the information for computing the first key in GHB;

decrypt the third encrypted block using the first key and extract the file usage policy from the first data record block;

compute the second key using information in the first data record block;

decrypt the second encrypted block using the second key;

discard the second random data block;

compute the third key using the information in the second data record block and extract the adapter data;
decrypt the first encrypted block using the third key;
discard the first random data block; and
extract the electronic data from the secured data file.

10. The system as claimed in claim 9, wherein the writer module is configured to generate a secured data file format for the encrypted electronic data, said writer module configured to create a secured data file format comprising:
the data signature block;
the gateway header block encrypted with a fixed key and information to compute a first key;
the file icon block;
the open data block;
the first data record block;
the second data record block;
the first random data block;
the file data block; and
the second random data block;
wherein the file data block forms a first encrypted block, the second encrypted block is created by encrypting the second data record block, the first random data block, the first encrypted block and the second random data block, and wherein the third encrypted block is created by encrypting the first data record block and the second encrypted block.

* * * * *